No. 608,935. Patented Aug. 9, 1898.
C. P. VERNIER.
HEATING DRUM.
(Application filed Aug. 26, 1897.)
(No Model.)
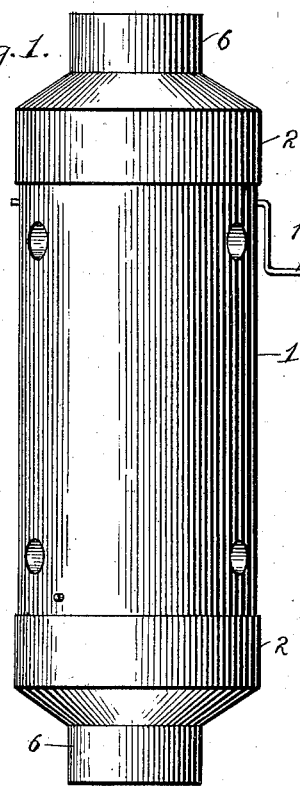
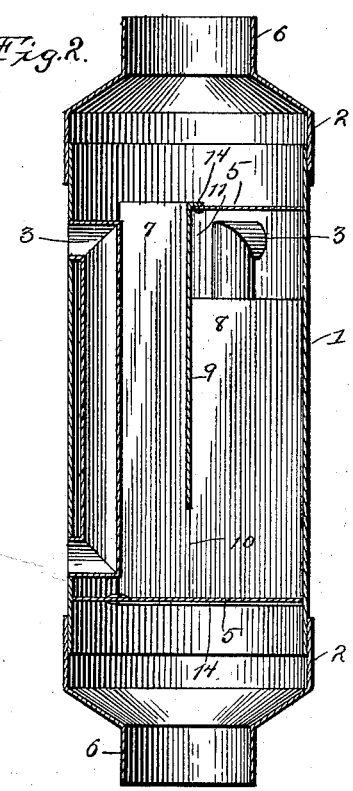
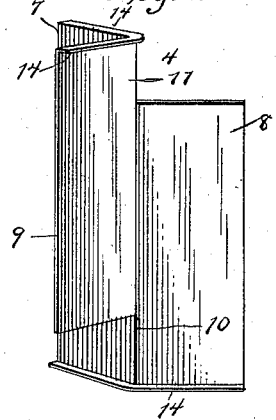
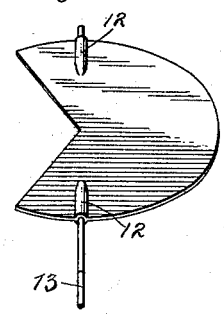
Witnesses
L. D. Heinrichs.
Victor J. Evans.
Inventor
Charles P. Vernier
By John Wedderburn.
Attorney

UNITED STATES PATENT OFFICE.

CHARLES P. VERNIER, OF BUTLER, INDIANA.

HEATING-DRUM.

SPECIFICATION forming part of Letters Patent No. 608,935, dated August 9, 1898.

Application filed August 26, 1897. Serial No. 649,606. (No model.)

*To all whom it may concern:*

Be it known that I, CHARLES P. VERNIER, of Butler, in the county of De Kalb and State of Indiana, have invented certain new and useful Improvements in Heating-Drums; and I do hereby declare the following to be a full, clear, and exact description of the invention, such as will enable others skilled in the art to which it appertains to make and use the same.
This invention relates to improvements in heating apparatus, and has more particular relation to heating-drums.

The invention consists of certain novel constructions, combinations, and arrangements of parts, all of which will be hereinafter more particularly set forth and claimed.

In the accompanying drawings, forming part of this specification, Figure 1 represents a side elevation of the device embodying my invention. Fig. 2 represents a central vertical section through the same. Fig. 3 represents an enlarged detail perspective view of the partitions or wings, and Fig. 4 represents an enlarged detail perspective view of one of the dampers.

1 in the drawings represents the casing of my improved device; 2 2, the top and bottom caps of the same; 3 3, the heating-pipes; 4, the partition, and 5 5 the dampers. Said casing 1 is preferably cylindrical, as shown in the drawings, and is provided with two heads or caps 2 2, which close, respectively, the upper and lower ends of said casing and are provided with annular flanges 6 6 for the application of the device to the usual-sized stovepipe. Said heating-tubes 3 are preferably three in number and extend from the top to the bottom of the casing 1, having communication at each end with the exterior of said casing through suitable apertures formed therein. The partition 4, which is adapted to divide the interior casing 1 into three segmental compartments, comprises three wings or plates 7, 8, and 9, suitably secured together and to the interior of the casing 1, so as to include one of the pipes 3 in each chamber formed by said wings. The wing 7 is of full length; but the wings 8 and 9 are cut away, respectively, at the top and bottom, as at 10 and 11, for a purpose hereinafter more particularly set forth.

Each of the dampers 5 is of the peculiar segmental form shown in the drawings and is provided upon diametrically opposite sides with a trunnion 12 and a crank-handle 13, said trunnion and handle being journaled in opposite sides of the casing 1, so that the damper may be tipped to open or close the passage through the casing 1. The upper damper is arranged so as to close the chambers between the partitions 7 and 9 and 8 and 9, but leaves the chambers between the partitions 7 and 8 open, while the damper at the bottom of the casing is arranged to close the chambers between the partitions 7 and 8, and 8 and 9, leaving that between the partitions 7 and 9 open. When the dampers are closed, the smoke and other products of combustion passing up from the stovepipe enters the casing 1 in the chamber formed between the wings 7 and 8 and passes upward and through the recess portion 11 of the wing 8. It then passes downward into the chamber between the wings 8 and 9 and through the recess 10, thence upward between the wings 7 and 9 and out at the top of the casing. By this peculiar tortuous passage of the smoke and products of combustion the same are brought into very intimate contact with all of the heating-tubes 3, the heated air within said tubes passing out of the casing at the upper openings, while the cold air to be heated is drawn into said tubes through the openings at the bottom of the casing. In order to hold the damper in position when closed, I form the tops of the partitions 7 and 8 and the bottoms of the partitions 7 and 9 with lateral flanges 14, under which the edges of said dampers rest when closed. When so desired, both of the dampers may be opened, and thus permit the products of combustion to pass upward freely through the casing 1.

By my improved device the rooms of dwellings may be readily heated by simply inserting one of my improved drums into the stovepipe passing therethrough. The degree of heat required may also be regulated at will by simply opening and closing the dampers to a greater or less degree.

Having thus described my invention, what I claim as new, and desire to secure by Letters Patent, is—

1. In a heating-drum, the combination with the drum proper, of air-heating tubes extending through the same and opening laterally through said drum at top and bottom, and vertical radial partitions in said drum, arranged one on each side of each tube and having openings alternately at top and bottom for causing the products of combustion to follow a tortuous passage, substantially as described.

2. In a heating-drum, the combination with the drum proper, of air-tubes extending through the same and opening laterally at each end through said drum, radiating vertical partitions in said drum cut away alternately at top and bottom to form passages whereby the products of combustion pass up into a chamber between two of said partitions, as 7 and 8, over 8 and down through an adjoining chamber between the last-named and the adjoining partition and under the latter, whereby the heat and products of combustion are brought into contact with the air-tubes in said chambers, and dampers arranged to control the passage of the products of combustion, substantially as described.

3. In a heating-drum, the combination with the drum proper, of air-tubes mounted in the same and opening laterally at top and bottom through said drum, a plurality of radiating vertical partitions within said drum arranged to embrace an air-tube between each pair, and formed to cause the smoke and products of combustion to follow a tortuous passage through the chambers formed by said radial partitions, and pivoted dampers above and below said partitions arranged to close each a portion of the chambers formed by said partitions, substantially as described.

In testimony whereof I have signed this specification in the presence of two subscribing witnesses.

CHAS. P. VERNIER.

Witnesses:
J. C. VERNIER,
ANDREW J. BAXTER.